(12) United States Patent
Sorenson et al.

(10) Patent No.: US 6,802,515 B2
(45) Date of Patent: Oct. 12, 2004

(54) PULLABLE GOLF BAG HAVING DEPLOYABLE WHEELS

(75) Inventors: Lloyd R. Sorenson, Austin, TX (US); Mikal Greaves, Mountain View, CA (US)

(73) Assignee: Pullbag, Inc., Austin, TX (US)

( * ) Notice: Subject to any disclaimer, the term of this patent is extended or adjusted under 35 U.S.C. 154(b) by 5 days.

(21) Appl. No.: 10/236,113

(22) Filed: Sep. 6, 2002

(65) Prior Publication Data

US 2004/0046343 A1 Mar. 11, 2004

(51) Int. Cl.$^7$ .................................................. B62B 1/00
(52) U.S. Cl. ............................. 280/47.26; 280/DIG. 6; 280/47.23
(58) Field of Search ........................ 280/DIG. 6, 651, 280/652, 654, 655, 47.23, 47.27, 47.313, 645, 646, 47, 26; 248/98; D34/15; 224/274

(56) References Cited

U.S. PATENT DOCUMENTS

| | | | | |
|---|---|---|---|---|
| 2,957,707 A | * | 10/1960 | Zagwyn | 280/124.13 |
| 3,413,012 A | | 11/1968 | Coffman | |
| 3,489,426 A | * | 1/1970 | Bond | 280/40 |
| 3,985,372 A | | 10/1976 | Olsson | |
| 4,289,326 A | * | 9/1981 | Hawkes | 280/646 |
| 4,400,006 A | | 8/1983 | Larkin | |
| 4,822,071 A | | 4/1989 | Widegren | |
| 4,911,465 A | | 3/1990 | Hauer | |
| 5,435,546 A | * | 7/1995 | Rao | 224/274 |
| 5,478,097 A | | 12/1995 | Forma | |
| 5,480,178 A | * | 1/1996 | Suk | 280/646 |
| 5,496,054 A | * | 3/1996 | Wu | 280/646 |
| 5,967,543 A | | 10/1999 | Taylor | |
| 6,186,520 B1 | | 2/2001 | Barten | |
| 6,186,522 B1 | * | 2/2001 | Weis | 280/37 |
| 6,231,059 B1 | | 5/2001 | Cheldin | |

FOREIGN PATENT DOCUMENTS

| | | | |
|---|---|---|---|
| DE | 4225492 | * | 2/1994 |
| GB | 2340084 | * | 2/2000 |

OTHER PUBLICATIONS

A web page at http:www2.us.porsche.com/shop/product2.asp?pf%5Fid=WAP+060+037+12&sku%5Fimage=&dept%5Fid=4040&xsize=0&zusatz=&mscssid=BJXAP6P4L16U9MW9AKQL7VXBPWNH72A5#related, describing the Golf Travel Bag with Travel Cover, Porsche Selection—Dr. Ing. h.c. F. Porsche AG—North America.

* cited by examiner

Primary Examiner—Bryan Fischmann
(74) Attorney, Agent, or Firm—Seyfarth Shaw LLP

(57) ABSTRACT

An actuator for a golf bag has a handle and at least one wheel movable between first and second positions. The actuator comprises a frame, a first link engaged with the handle and engaged with the frame, and a second link. The second link is engaged with the at least one wheel, engaged with the frame, and engaged with the first link. The first and second links are movable to move the wheels between the first and second positions.

29 Claims, 7 Drawing Sheets

PULLABLE GOLF BAG HAVING DEPLOYABLE WHEELS

TECHNICAL FIELD OF THE INVENTION

This invention relates generally to golf bags, and relates more particularly to a pullable golf bag having deployable wheels.

BACKGROUND OF THE INVENTION

Golf is an activity enjoyed by many people. A typical round of golf involves nine or eighteen holes over a distance of several thousand yards. Some participants choose to cover this distance by riding in motorized carts, while others walk around the golf course. Among those who walk, some people carry their golf clubs in a bag, and others pull their golf bags on a wheeled cart.

A golf pull cart typically has two wheels, and can be motorized or non-motorized. Various designs have been proposed for such pull carts with wheels that are alternately extendable or retractable. For example, U.S. Pat. No. 6,231,059 shows a golf bag pull cart having integral extendable rollers and a handle. This pull cart has a base that includes a wheel recess which at least partially accept the retracted wheels.

Non-motorized pull carts can weigh between about three pounds for a basic model, to thirteen pounds or more for a robust, all-terrain model. The average weight is approximately ten pounds. The golf bag averages six pounds, and when miscellaneous items such as balls, tees, gloves, rule books, etc. are included, the weight of the bag and items may approach ten pounds. A participant is allowed to carry a maximum of fourteen clubs, each weighing approximately a pound. The total weight of the pull cart, bag, golf items, and clubs can therefore exceed thirty pounds.

Participants that pull their golf bags on a cart typically are required to go through the following process before their round of golf. A participant most likely to drive to a golf course, therefore, they will pull their golf bag and cart from a storage place, either attached together or separate. They will carry or pull the approximately thirty-plus pounds of golf equipment to their vehicle, lift the approximately thirty-plus pounds and place it into their trunk or storage area of the vehicle. When they arrive at the golf course, they must lift the approximately thirty-plus pounds of golf equipment out of their vehicle, extend the wheels, and then begin pulling their golf equipment to their intended destination. The majority of the golfing public, from the beginning amateur to the professional, normally deems these processes to complex and atypical.

Many participants find the processes are also cumbersome, laborious and potentially fraught with injury from lifting the heavy objects in and out of their vehicles' trunk or storage area. Therefore, they forego the bulky cart aspect of this process and determine to carry the golf equipment (now absent the cart) and back on their shoulders now weighing just approximately twenty-four pounds while walking throughout their participation on the golf course.

While this eliminates the issues associated with pull carts, that being they are cumbersome and heavy, many participants find that carrying approximately twenty-four pounds of golf equipment for the entire round of golf can also become laborious and fraught with injury. Participants who routinely carry their golf equipment on their shoulder(s) complain of back strains and shoulder soreness from lifting, carrying, and setting down the golf bag between shots.

A benefit of walking during golf is the exercise achieved. Many participants desire to achieve this exercise through walking on the golf course, but dislike the cumbersome, complicated and atypical processes associated with attached pull carts. Others desire to walk, but dislike having to carry their equipment on their shoulder(s) for an entire walk over thousands of yards of the golf course, which can last upwards of five hours. In fact, very few sports, with the exception of archery (carrying a quiver on the shoulder for arrows) biathlons (skiing with a rifle on the shoulder) have as the norm carrying equipment between specific activities in the conduct of the sport, especially equipment weighing approximately twenty-four pounds.

SUMMARY OF THE INVENTION

The present invention is an actuator for a golf bag having a handle and at least one wheel movable between first and second positions. The actuator comprises a frame, a first link engaged with the handle and engaged with the frame, and a second link. The second link is engaged with the at least one wheel, engaged with the frame, and engaged with the first link. The first and second links are movable to move the wheels between the first and second positions.

Accordingly, it is an object of the present invention to provide an actuator of the type described above that moves the wheels between extended and retracted positions.

Another object of the present invention is to provide a golf bag of the type described above that can be carried or pulled over the ground.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
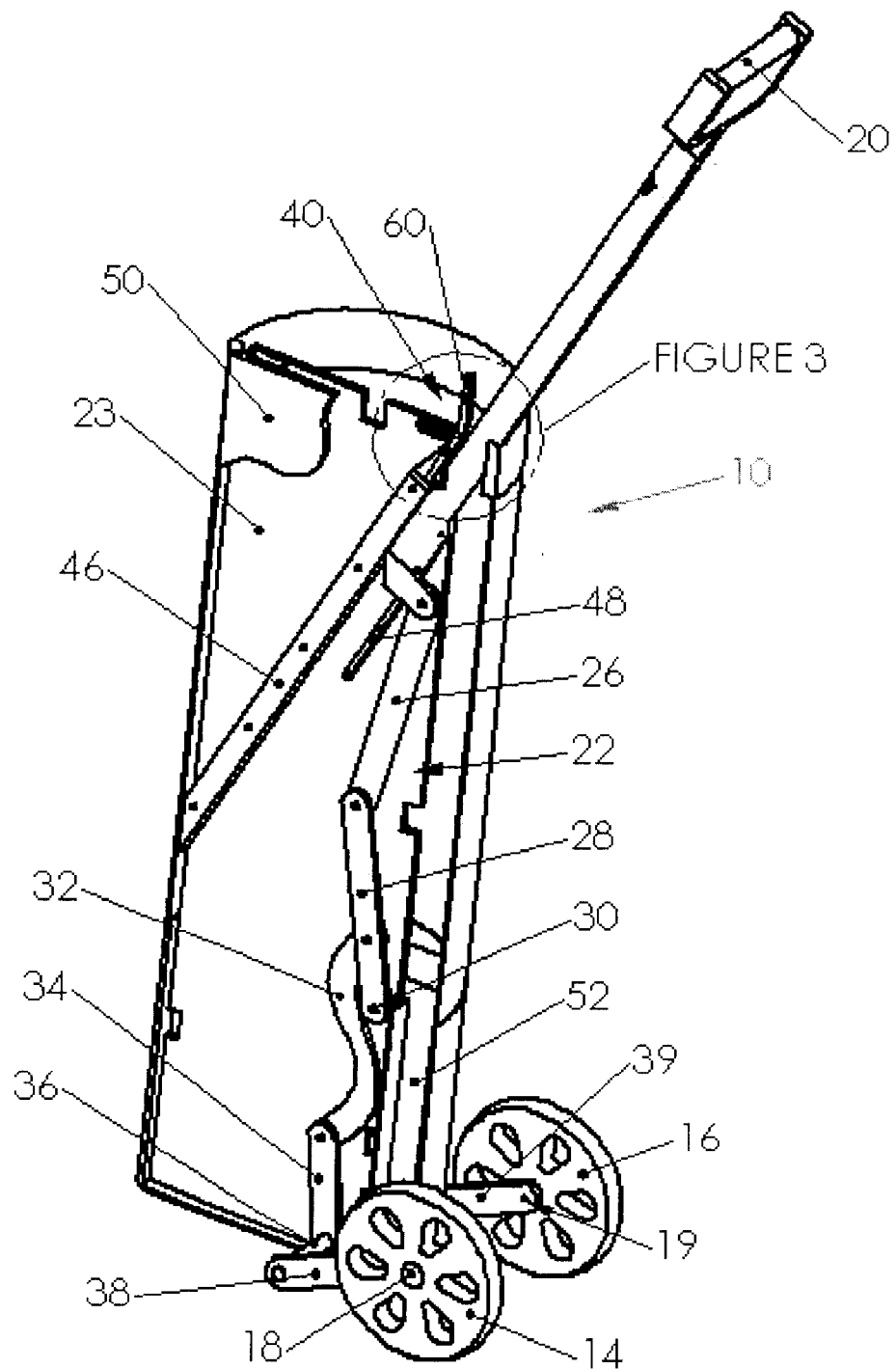
FIG. 1 is a partially cut-away cross-sectional perspective view of a golf bag according to the present invention with a pair of wheels in an extended position.
Figure 2:
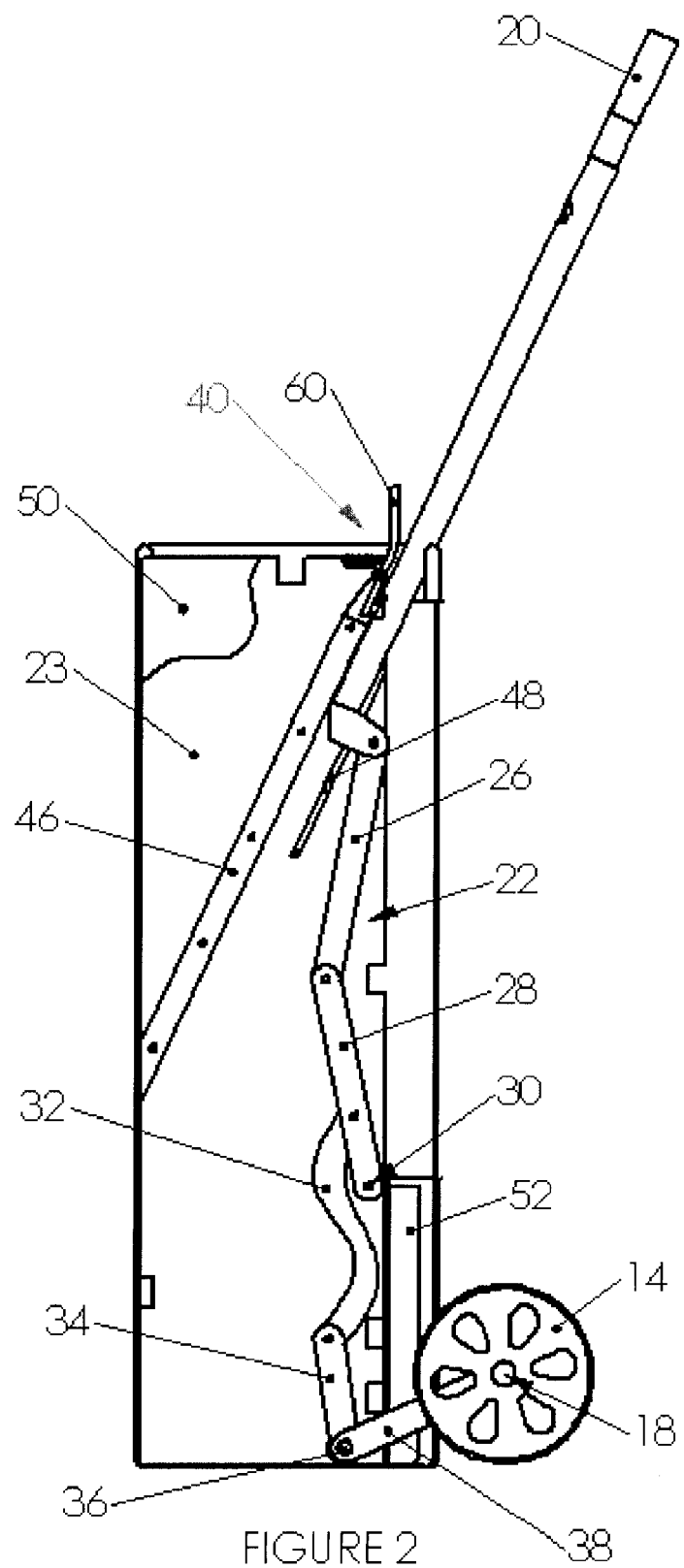
FIG. 2 is a cross-sectional view of the golf bag with the wheels in the extended position.

FIGS. 1 and 2 show one embodiment 10 of a golf bag according to the present invention. The golf bag 10 comprises a body 12 configured to hold golf clubs in conventional fashion, and a pair of retractable wheels 14 and 16 disposed proximate the bottom of the body. The wheels 14 and 16 are preferably mounted on respective individual axles 18 and 19. A handle 20 extends from the top of the golf bag such that a user may pull the bag while the wheels 14 and 16 roll over the ground.

An actuator 22 is provided for retracting the wheels 14 and 16 within the golf bag 10. The actuator 22 extends within the body of the golf bag 10 between the handle 20 and the wheels 14 and 16, and includes an internal frame, such as a plate 23, and a plurality of links. The plate 23 is preferably generally rectangular, with its shorter sides situated proximate the top and bottom of the golf bag 10. A first link 26 is pivotably engaged at one end with the lower end of the handle 20, and pivotably connected to the top end of a second link 28. The lower end of the second link 28 is connected to a pivot 30 that is optionally fixed to the plate 23. A third, curved link 32 is pivotably connected at its upper end to a midpoint of the second link 28. The lower end of the curved link 32 is pivotably connected to the upper end of a fourth link 34. The lower end of the fourth link 34 is connected to an axle 36 proximate the bottom of the plate 23. The axle 36 extends laterally, and is fixedly connected at its opposite ends to a pair of fifth links 38 and 39, respectively. The links 38 and 39 are in turn respectively rotatably connected to the axles 18 and 19.

Figure 3:
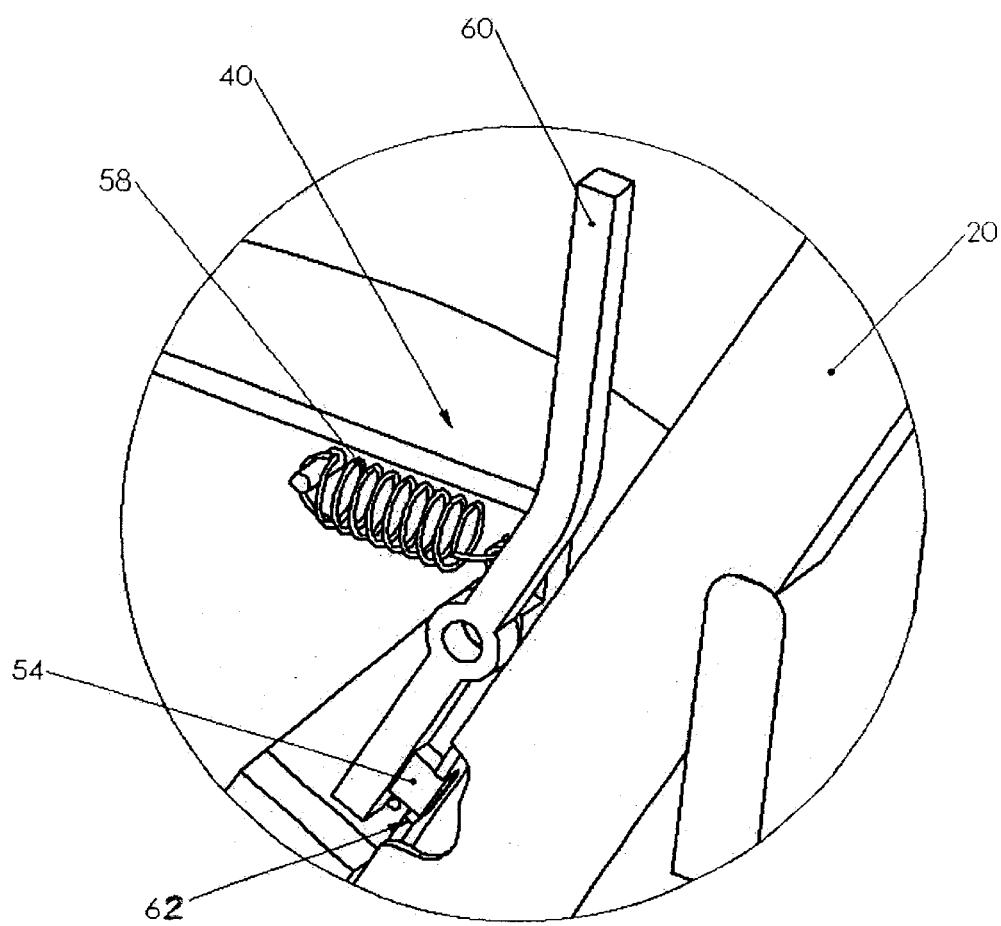
FIG. 3 is an enlarged view of the portion indicated by the circle 3 in FIG. 1.

The golf bag 10 is equipped with means for locking the wheels 14 and 16 in their extended position shown in FIG. 1. To this end, a latch 40 is pivotally mounted to the bag generally above the handle as shown in FIG. 3, one end of the latch 40 has a tang 54 that is selectively engageable with a notch 62 in the bottom of the handle 20. A spring 58 is attached between an anchor point and above the latch pivot and toward the opposite end 60 of the latch 40. The tang 54 is thereby biased toward the bottom of the handle 20 and engages therewith when aligned with the notch 62 to lock the wheels 14 and 16. The latch 40 is selectively, manually disengageable with the handle 20 for retracting the wheels 14 and 16. As an alternative to the latch 40 or in addition thereto, pins may also be provided for fixing the lowest links 38 and 39 relative to the bottom of the golf bag 10. In one embodiment, the pins extend through holes in the bottom of the golf bag, and are retained therein by any suitable means such as clips.

Figure 4:
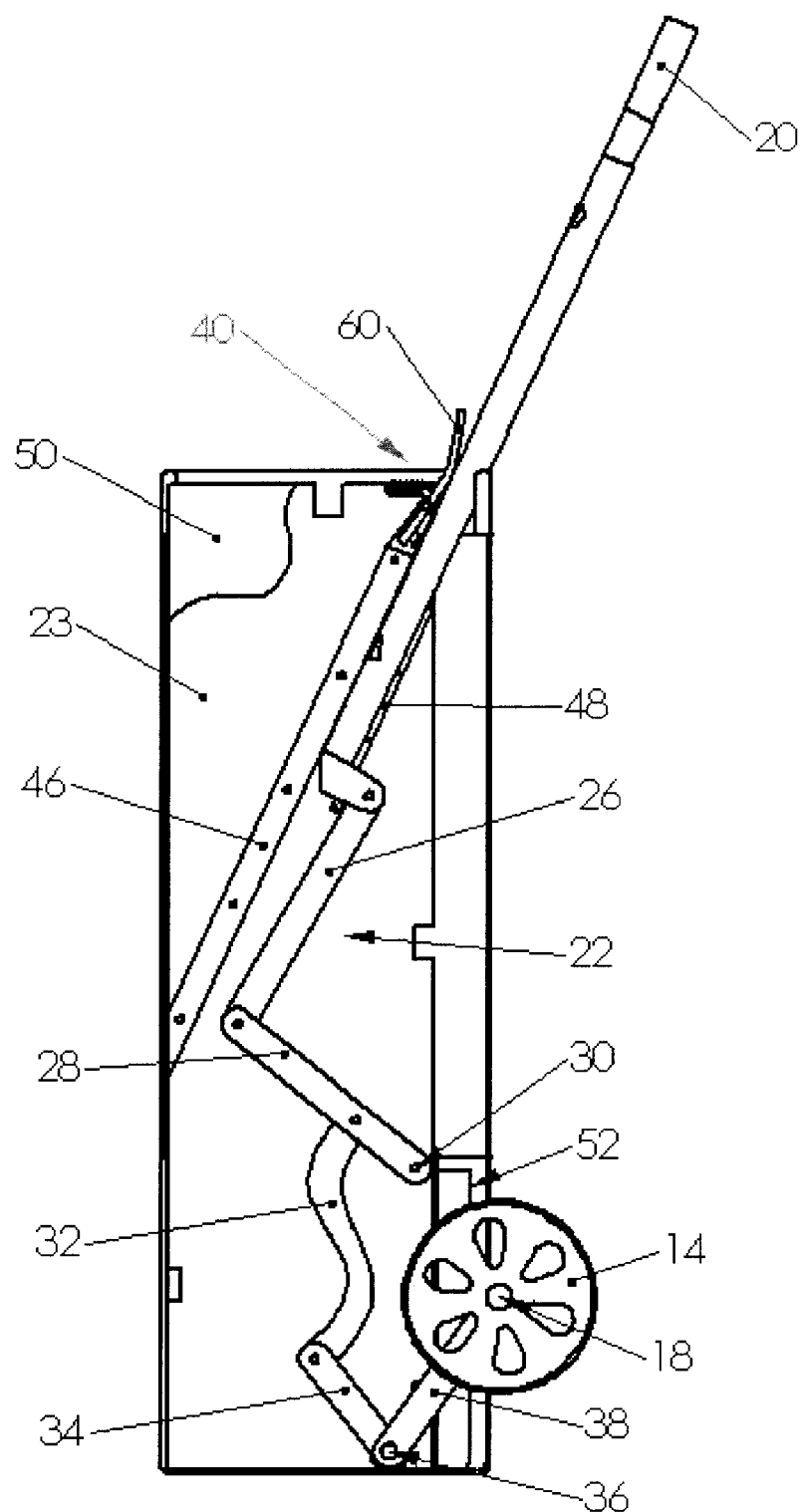
FIG. 4 is a cross-sectional view of the golf bag with the wheels in a first intermediate position.
Figure 5:
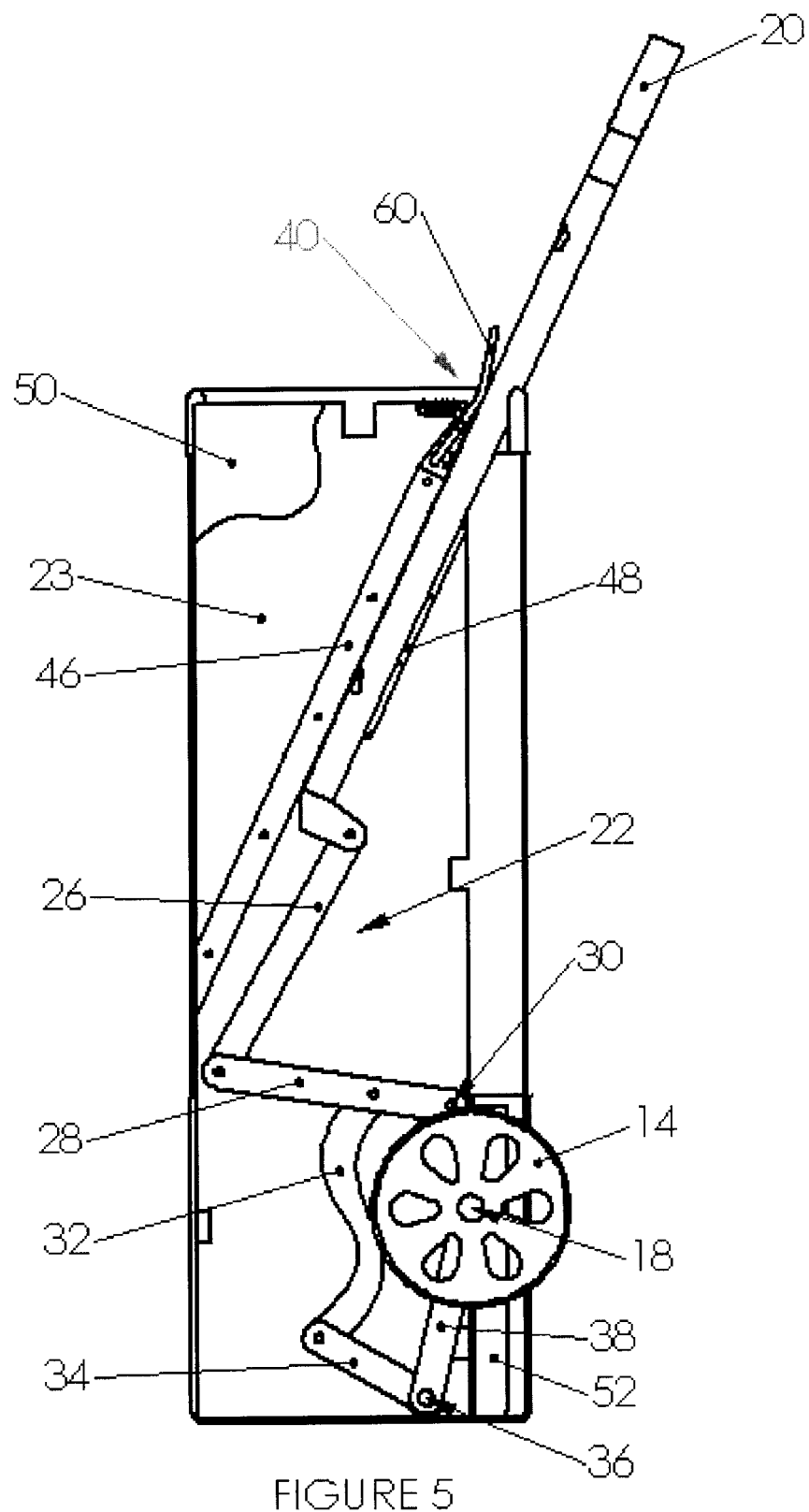
FIG. 5 is a cross-sectional view of the golf bag with the wheels in a second intermediate position.
Figure 6:
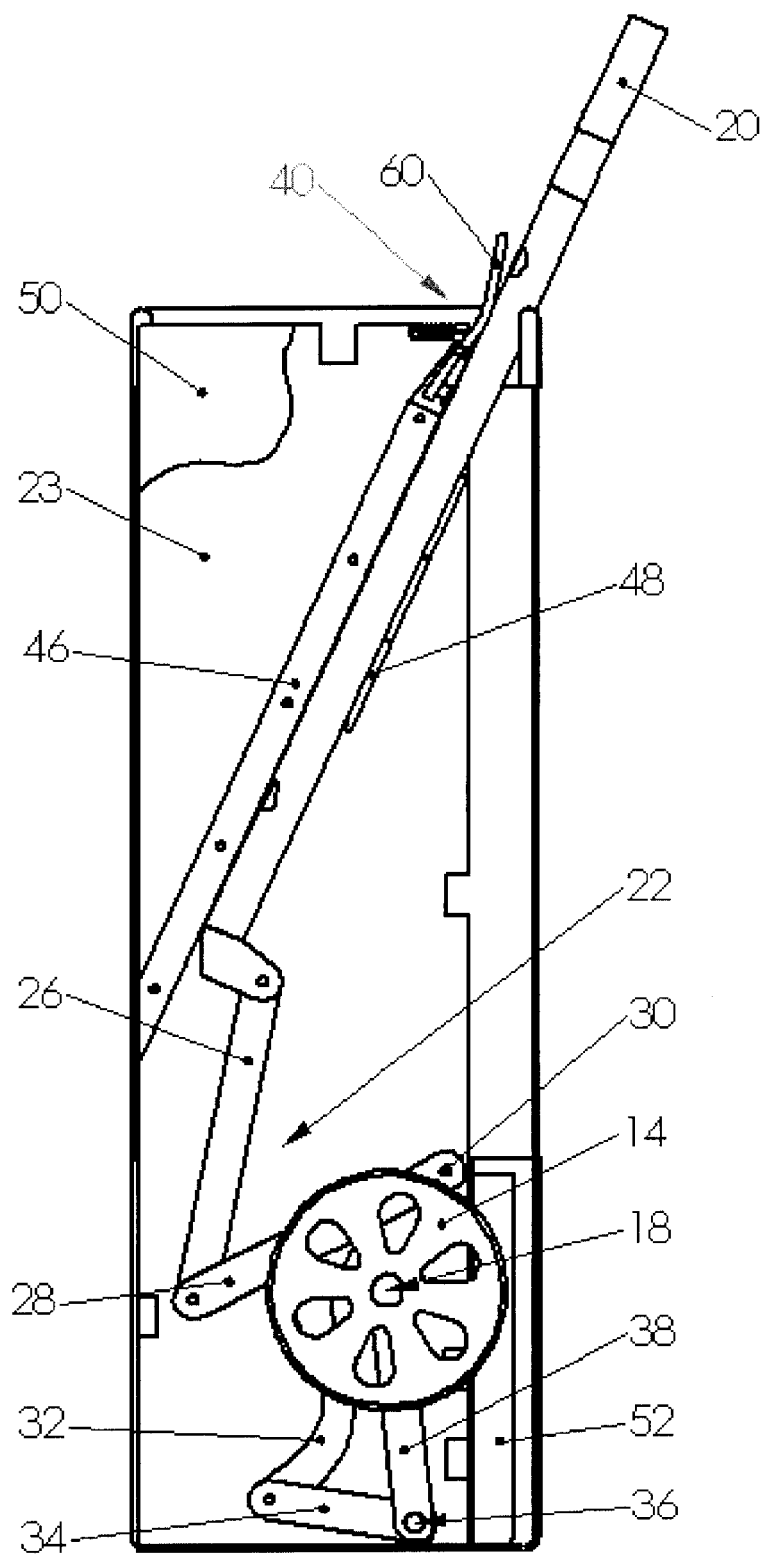
FIG. 6 is a cross-sectional view of the golf bag with the wheels in a third intermediate position.

To retract the wheels 14 and 16, the latch 40 is depressed and the handle 20 is biased downwardly toward the interior of the golf bag 10. FIG. 4 shows an intermediate view of the retraction process, and FIG. 5 shows a further intermediate view of the retraction process where the links 26 and 28 have collapsed to form an approximate right angle. In the position shown in FIG. 5, the link 28 lies nearly parallel with the bottom of the golf bag 10, and the wheel axles 18 and 19 are largely disposed within the periphery of the bag. As the handle 20 is further inserted between track members 46 and 48 fixed to the plate 23, the actuator 22 assumes the position shown in FIG. 6. In this position, the link 28 has rotated beyond parallel with the bottom of the bag 10 and the wheels 14 and 16 are entirely within the bag 10. A cover 50 overlies the links and the track members 46 and 48, and is engaged with the plate 23 to contain those components therebetween.

Figure 7:
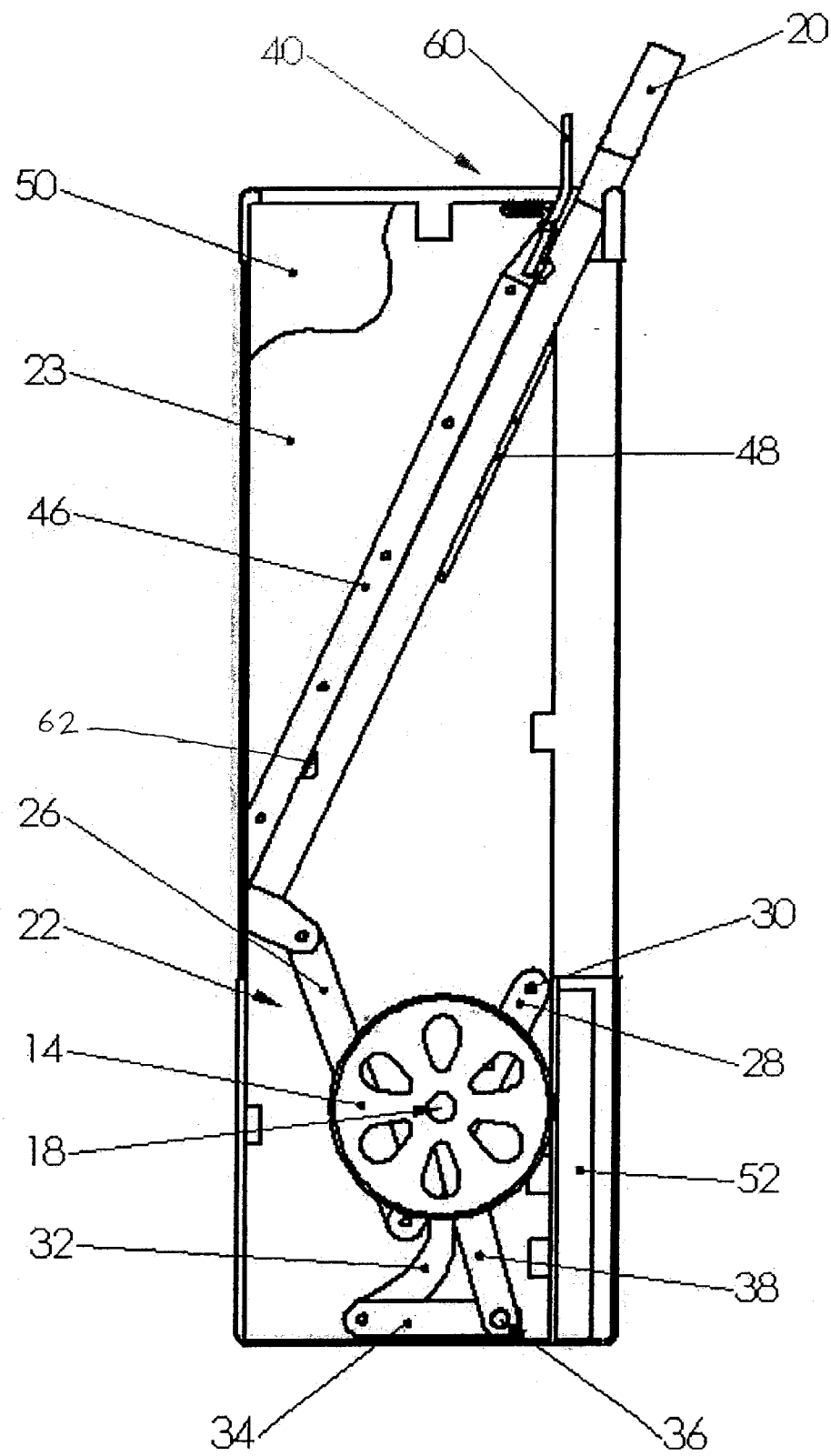
FIG. 7 is a cross-sectional view of the golf bag with the wheels in a fully retracted position.

FIG. 7 shows the final position of the actuator 22 and the wheels 14 and 16. In this position, the tang 54 of the latch 40 locks into a second notch 62 in the handle 20, which may be largely or entirely withdrawn within the perimeter of the golf bag 10. In a preferred embodiment, the wheels 14 and 16 in this final retracted position are hidden from view within protective pockets 52. The pockets 52 may be formed from a hardened, lightweight material such as plastic, a more flexible material such as the fabric out of which the remainder of the bag 10 is formed, or from any other suitable material. Depending on the width of the wheels 14 and 16 and the circumference of the golf bag 10, the pockets 52 may extend laterally outside of the dimensions of the bag.

This present invention thus solves issues conventionally associated with walking on the golf course. Through a minimally weighted, mostly hidden from view, extractable pull handle and deployable wheels mechanism, coupled and integrated within the confines of a typical golf bag, a participant has the option to pull or carry their golf bag during the course of their participation.

While the embodiments of the invention disclosed herein are presently considered to be preferred, various changes and modifications can be made without departing from the spirit and scope of the invention. For example, the present invention contemplates that the wheels may be mounted on a single axle. The scope of the invention is indicated in the appended claims, and all changes that come within the meaning and range of equivalents are intended to be embraced therein.

What is claimed is:

1. A golf bag having a handle and at least one wheel movable between first and second positions, the golf bag comprising:
   a body having a track for slidably receiving the handle;
   a first link engaged with the handle; and
   a second link disposed within the body, the second link connected to at least one wheel, engaged with the body, and engaged with the first link; and
   the first and second links being movable to move the wheels between the first and second positions upon sliding of the handle into or out of the body of the bag.

2. The golf bag of claim 1 wherein the second link is engaged with the first link through at least third and fourth links.

3. The golf bag of claim 2 wherein the third link is pivotably connected to the first link and the fourth link is pivotably connected to the second link.

4. The golf bag of claim 1 further comprising a latch engaged with the body.

5. The golf bag of claim 1 wherein a portion of the actuator is disposed within a body of the golf bag.

6. The golf bag of claim 1 further comprising means for locking the wheels.

7. The golf bag of claim 1 further comprising a latch engagable with the handle for locking the wheels.

8. The golf bag of claim 1 wherein the at least one wheel in the first position is extended.

9. The golf bag of claim 1 wherein the at least one wheels is disposed on an axle.

10. The golf bag of claim 1 wherein the body includes a plate.

11. A golf bag comprising:
   an inner cavity for receiving golf clubs;
   a top in communication with the inner cavity
   a handle movable between a first condition protruding from a top of the golf bag and a second condition where a majority of the handle is received within the inner cavity through the top;
   at least one wheel movable between first and second positions;
   a plate mounted in the cavity;
   an actuator attached to the handle and for actuating the wheel; and at
   least a portion of the actuator disposed adjacent to the plate;
   wherein upon movement of the handle from the first condition to the second condition the actuator moves the wheels between the first and second positions.

12. The golf bag of claim 11 wherein the actuator includes a first link and a second link and the second link is engaged with the first link through at least third and fourth links.

13. The golf bag of claim 12 wherein the third link is pivotably connected to the first link and the fourth link is pivotably connected to the second link.

14. The golf bag of claim 11 further comprising a cover engaged with the plate.

15. The golf bag of claim 11 wherein a portion of the actuator is disposed within a body of the golf bag.

16. The golf bag of claim 11 further comprising means for locking the wheels.

17. The golf bag of claim 11 further comprising a latch engagable with the handle for locking the wheels.

18. The golf bag of claim 11 wherein the at least one wheel in the first position is extended.

19. The golf bag of claim 11 wherein the at least one wheels is disposed on an axle.

20. The golf bag of claim 11 wherein the actuator is pivotally attached to the plate.

21. A golf bag comprising:

a body having a top and bottom end;

a handle attached to the body;

a pair of wheels;

a plate extending generally between a top and bottom end; and an actuator including a first link engaged with the handle and the handle engaged by the plate; and a second link connected to the wheels, pivotally attached to the plate, and engaged with the first link; and the first and second links being movable in order to move the wheels between a first position wherein the wheels are adapted to roll on the ground and a second position wherein the wheels are retracted.

22. The golf bag of claim 20 wherein the second link is connected to the wheels through at least third and fourth links.

23. The golf bag of claim 22 wherein the third link is pivotably connected to the second link and the fourth link is pivotably connected to the third link.

24. The golf bag of claim 20 further comprising a latch engaged with the plate.

25. The golf bag of claim 20 wherein a portion of the actuator is disposed within a body of the golf bag.

26. The golf bag of claim 20 further comprising means for locking the wheels.

27. The golf bag of claim 20 further comprising a latch engagable with the handle for locking the wheels.

28. The golf bag of claim 20 wherein the at least one wheel in the first position is extended.

29. The golf bag of claim 20 wherein the at least one wheels is disposed on an axle.

* * * * *

UNITED STATES PATENT AND TRADEMARK OFFICE
CERTIFICATE OF CORRECTION

| | |
|---|---|
| PATENT NO. | : 6,802,515 B2 |
| APPLICATION NO. | : 10/236113 |
| DATED | : October 12, 2004 |
| INVENTOR(S) | : Sorenson et al. |

It is certified that error appears in the above-identified patent and that said Letters Patent is hereby corrected as shown below:

Column 4, line 31, in claim 2, "through" should read --and--

Column 4, line 39, in claim 5, "actuator" should read --handle--

Column 5, line 3, in claim 12, "through" should read --and--

Column 6, line 3, in claim 21, "by the plate" should read --by a track member of the plate--

Column 6, line 10, in claim 22, "claim 20" should read --claim 21--

Column 6, line 16, in claim 24, "claim 20" should read --claim 21--

Column 6, line 18, in claim 25, "claim 20" should read --claim 21--

Column 6, line 20, in claim 26, "claim 20" should read --claim 21--

Column 6, line 22, in claim 27, "claim 20" should read --claim 21--

Column 6, line 24, in claim 28, "claim 20" should read --claim 21--

Column 6, lines 24-25, in claim 28, "the at least on wheel is" should read --the wheels are--

UNITED STATES PATENT AND TRADEMARK OFFICE
CERTIFICATE OF CORRECTION

PATENT NO. : 6,802,515 B2
APPLICATION NO. : 10/236113
DATED : October 12, 2004
INVENTOR(S) : Sorenson et al.

It is certified that error appears in the above-identified patent and that said Letters Patent is hereby corrected as shown below:

Column 6, line 26, in claim 29, "claim 20" should read --claim 21--

Column 6, lines 26-27, in claim 29, "the at least one wheels is" should read --the wheels are--

Signed and Sealed this

Sixth Day of May, 2008

JON W. DUDAS
*Director of the United States Patent and Trademark Office*